US007907724B2

(12) United States Patent
Fischer (10) Patent No.: US 7,907,724 B2
(45) Date of Patent: Mar. 15, 2011

(54) METHOD AND APPARATUS FOR PROTECTING AN RSA CALCULATION ON AN OUTPUT BY MEANS OF THE CHINESE REMAINDER THEOREM

(75) Inventor: Wieland Fischer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 810 days.

(21) Appl. No.: 11/924,095

(22) Filed: Oct. 25, 2007

(65) Prior Publication Data
US 2009/0110187 A1   Apr. 30, 2009

(51) Int. Cl.
  *H04L 9/00* (2006.01)
  *H04L 9/30* (2006.01)
(52) U.S. Cl. .............. 380/28; 380/29; 380/30; 713/155; 713/156; 713/157; 713/158
(58) Field of Classification Search ............ 380/28
   See application file for complete search history.

(56) References Cited

U.S. PATENT DOCUMENTS 5,321,752 A * 6/1994 Iwamura et al. ............ 713/174
5,991,415 A * 11/1999 Shamir ..................... 380/30

FOREIGN PATENT DOCUMENTS

| EP | 1 454 260 B1 | 6/2005 |
| EP | 1 442 391 B1 | 8/2005 |
| WO | WO 2006/103149 A1 | 10/2006 |

OTHER PUBLICATIONS

Aumueller, C., et al.; "Fault Attacks on RSA with CRT: Concrete Results and Practical Countermeasures"; B.S. Kaliski Jr. et al. (Eds.): CHES 2002, LNCS 2523, pp. 260-275, 2003. ©Springer-Verlag Berlin Heidelberg 2003.
Boneh, D., et al.; "On the Importance of Checking Cryptographic Protocols for Faults"; Copyright (c) 1998, Springer-Verlag.
Yen, Sung-Ming, et al.; "Checking Before Output May Not Be Enough Against Fault-Based Cryptanalysis"; IEEE Transactions on Computers, vol. 49, No. 9, pp. 967-970, Sep. 2000.
Boneh, D., et al.; "On the Importance of Eliminating Errors in Cryptographic Computations"; Journal of Cryptology (2001) 14: 101-119.

* cited by examiner

*Primary Examiner* — Longbit Chai
(74) *Attorney, Agent, or Firm* — Dickstein Shapiro LLP (57) ABSTRACT

An apparatus for protecting an RSA calculation of an output based on input values by means of the Chinese remainder theorem, the apparatus comprising for a first determining device adapted to determine a first security parameter based on the input values, a computing device adapted to compute a control value based on the first security parameter and the input values, a calculating device adapted to calculate a modified input parameters based on the input values and the first security parameter, for a performing device adapted to perform the RSA calculation based on the modified input values to obtain a single modified output, and for a second determining device adapted to determine whether the single modified output is in a predetermined relation to the control value and applying a countermeasure in case the predetermined relation is not fulfilled.

25 Claims, 3 Drawing Sheets

FIG 3

METHOD AND APPARATUS FOR PROTECTING AN RSA CALCULATION ON AN OUTPUT BY MEANS OF THE CHINESE REMAINDER THEOREM

BACKGROUND

The present invention relates to cryptography and, in particular, to a method and an apparatus for protecting an RSA calculation of an output based on input values by means of the Chinese remainder theorem (CRT).

Modular exponentiation is one of the core calculations for various cryptographic algorithms. One example of a widespread cryptographic algorithm is the RSA cryptosystem.

Let $N=p \cdot q$ be the product of two large input primes p and q. Let also a public exponent e be coprime to $\phi(N)=(p-1)(q-1)$, wherein $\phi(.)$ denotes Euler's totient function. Thereby the totient $\phi(.)$ of a positive integer n is defined to be the number of positive integers less than or equal to n that are coprime to n. A corresponding secret exponent to the public exponent e is $d=e^{-1} \mod \phi(N)$. For the RSA cryptosystem the output or a signature on an input message M is given by $$S=M'^d \mod N, \qquad (1)$$

wherein $M'=\mu(M)$ for some deterministic padding function $\mu$. The validity of the output S can be then publicly verified by checking whether $S^e=\mu(M)(\mod N)$, using the public exponent e.

Most implementations of the widely-used RSA cryptosystem rely on the Chinese remainder theorem as this greatly improves the performance in both running time as well as memory requirement. In CRT mode of the RSA cryptosystem, the secret parameters are $d_p=d \mod (p-1)$, $d_q=d \mod (q-1)$ and $q_{inv}=q^{-1} \mod p$. The output S is then computed as $$S=CRT(S_p,S_q)=S_q+q[q_{inv}(S_p-S_q) \mod p], \qquad (2)$$

with $$S_P=M'^{d_p} \mod p,$$

$$S_q=M'^{d_q} \mod q. \qquad (3)$$

Unfortunately, CRT-based implementations of the RSA cryptosystems are also known to be more sensitive to fault attacks. A single fault in an RSA exponentiation may reveal the two secret input prime factors p, q through a gcd-computation (gcd=greatest common divisor). Differential fault attacks against the RSA cryptosystem with CRT have emerged to one of the most important attack scenarios (not only) against RSA, since the publication of Boneh et al., "On the Importance of Checking Cryptographic Protocols for Faults(Extended Abstract), Eurocrypt 1997, pages 37 to 51. A lot of fault attacks have been described in the meantime. Countermeasures to the fault attacks are as diverse as the fault attacks themselves. The first and best known countermeasure is described in U.S. Pat. No. 5,991,415. This specialist publication suggests using a small random number r and to compute the two half exponentiations, $S_p$ and $S_q$ of equations (3) in a redundant way, that is $$S_p^*=M'^d \mod rp$$

$$S_q^*=M'^d \mod rq, \qquad (4)$$

and to return the output $S=CRT (S_p^*. S_q^*) \mod N$ in case $S_p^*=S_q^*(\mod r)$ and an error or countermeasure otherwise.

Most of the countermeasures of today work on the principle described in U.S. Pat. No. 5,991,415. Redundancy is introduced into the RSA computation, which is checked at the end of the computation and, based on the success of the tests, the (correct) signature is output or the wrong signature is suppressed.

Another alternative is to base a fault-check on a one- or zero-comparison and, in the case of an inequality, to combine the comparing number with a signature, such that the signature is changed or infected in such a way in case of an error, such that an attacker cannot draw any conclusions on the secret key. In this case, a dedicated error output can be avoided, since a double disturbed signature is output.

In case an attacker is able to disturb the check as well, he might be able to suppress the error output or the infection of the signature. For this reason, also the fault revealing parts of the algorithms have to be protected. This is not always an easy task, since it is not possible to know every possible fault attack (used in the future). Due to the diverse fault attacks, additional fault-checks have been added to the algorithms. Each of those fault-checks is a potential target for an attack and has to be carefully protected. For this reason, an RSA cryptosystem might become more and more complex related to a security evaluation, since it has to be secured that the fault-checks cover the whole computation seamlessly.

Hence, it would be desirable to secure the whole critical computation of an RSA-CRT cryptosystem by using as few fault-checks as possible.

BRIEF SUMMARY

Embodiments of the present invention provide an apparatus for protecting an RSA calculation of an output based on input values by means of the Chinese remainder theorem, the apparatus comprising a first determining device adapted to determine a first security parameter based on the input values, a computing device adapted to compute a control value based on the first security parameter and the input values, a calculating device adapted to calculate a modified input parameters based on the input values and the first security parameter, a performing device adapted to perform the RSA calculation based on the modified input values to obtain a single modified output, and a second determining device adapted to determine whether the single modified output is in a predetermined relation to the control value and applying a countermeasure in case the predetermined relation is not fulfilled.

Further embodiments of the present invention provide an apparatus for protecting an RSA calculation of an output message based on an input message and a first and a second input value by means of the Chinese remainder theorem, the apparatus comprising a first register for the first input value, a second register for the second input prime, a third register for the input message, a fourth register for a first security parameter, a fifth register for a control value, wherein a register content of the fourth register is determined based on register contents of the first and the second registers, wherein the fifth register content is determined based on the register contents of first, the second, the third and the fourth register, and wherein the apparatus comprises a processing sub-unit configured to compute a single modified output message based on modified register contents of the first and second register, and to determine whether the single modified output message is in a predetermined relation to the register content of the fifth register and to apply a countermeasure in case the predetermined relation is not fulfilled.

Further embodiments of the present invention provide a method for protecting an RSA calculation of an output based on input values by means of the Chinese remainder theorem comprising determining a first security parameter based on the input values, computing a control value based on the first security parameter and the input values, calculating modified input parameters based on the input values and the first security parameter, performing the RSA calculation based on the modified input values to obtain a single modified output and determining whether the single modified output is in a predetermined relation to the control value and applying a countermeasure in case the predetermined relation is not fulfilled.

BRIEF DESCRIPTION OF THE DRAWINGS

In the following, embodiments of the present invention are explained in more detail with reference to the accompanying drawings, in which.

DETAILED DESCRIPTION

With regard to the following description, it should be noted that in the different embodiments, equally operating functional elements have the same reference numerals and, thus, the descriptions of those functional elements are exchangeable in the different embodiments illustrated in the following.

Figure 1:
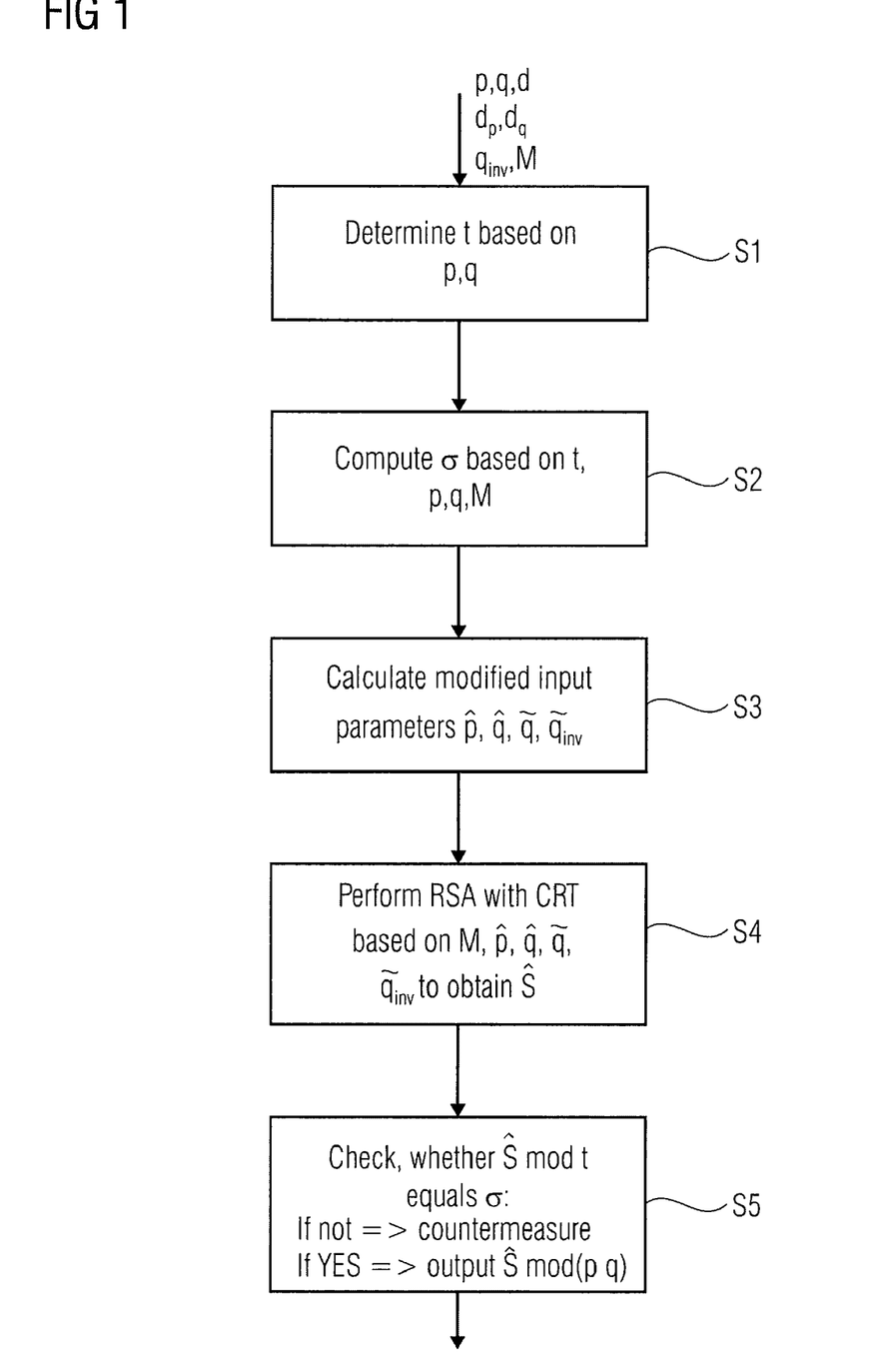
FIG. 1 shows a flow chart of a method for protecting an RSA calculation by means of the Chinese remainder theorem according to an embodiment of the present invention.

FIG. 1 shows a flow chart of a method for protecting an RSA calculation of an output S based on input values p, q, d and M by means of the Chinese remainder theorem.

From the input values p, q and d further values $d_p = d \mod (p-1)$, $d_q = d \mod (q-1)$ and $q_{inv} = q^{-1} \mod p$ can be derived.

In a first step S1, a first security parameter t is determined based on the input values p and q. In a second step S2, a control value σ is computed based on the first security parameter t and the input values p, q and M. In a third step S3, modified input parameters $\hat{p}$, $\hat{q}$, $\tilde{q}$, $\tilde{q}_{inv}$ are calculated based on the input values p, q and the first security parameter t. In a fourth step S4, the RSA calculation with CRT is performed based on the modified input values $\hat{p}$, $\hat{q}$, $\tilde{q}$, $\tilde{q}_{inv}$ to obtain a single modified output $\hat{S}$. In a further step S5, it is determined whether the single modified output $\hat{S}$ is in a predetermined relation to the control value σ. A countermeasure is applied in case the predetermined relation is not fulfilled.

Thereby, the countermeasure could be e.g. to suppress the calculation and output of the output or output signature S stemming from the single modified output $\hat{S}$. Alternatively, the output signature S could be computed in any case and, as a countermeasure, in case the predetermined relation is not fulfilled, be further infected or falsified.

According to embodiments of the present invention the step S5 includes a sub-step of extracting the output signature S based on the single modified output signature $\hat{S}$ and the input values p, q.

After an overview of the inventive method has been given schematically referring to FIG. 1, embodiments of the single steps S1 to S5 shall be explained in more detail in the following.

In step S1, the first security parameter t is chosen as a random prime having a word length of, for example, 32 bits. Thereby, the first security parameter t has to have certain properties, in particular, that the modular multiplicative inverse $q_{inv}$ of the input prime q modulo the input prime p modularly reduced by the first security parameter t is not equal to 0 and that the modular reduction of a product of the modular multiplicative inverse $q_{inv}$ of the input prime q and the input prime q with respect to the modulus t is not equal to 1, that is $$q_{inv} \mod t \neq 0 \text{ and} \quad (5)$$

$$\zeta_t = q_{inv} \cdot q \mod t \neq 1. \quad (6)$$

In particular, $\zeta_t$ has to be outside the interval between 0 and 1, i.e. $\zeta_t \notin \{0,1\}$.

According to an embodiment of the present invention, in step S1, a candidate for the first security parameter t is chosen to fulfill equations (5) and (6) and then the property $\zeta_t \notin \{0,1\}$ is checked. If it is not fulfilled, then a new first security parameter t will be used. Note that the input prime q and its modular inverse $q_{inv}$ are secret and nearly random parameters. An attacker cannot force them to have certain values or, if he could, one could say that such an attack would not make any sense, since this is the value he wants to extract. So, the probability that the condition $\zeta_t \notin \{0,1\}$ is not fulfilled is about 2/t and it will practically never happen that two or more values for t will be thrown away.

In step S1, it is further important that $\phi(t-1)$ is as big as possible. This value is directly related to the error detection probability. Since (t−1) is an even integer, $\phi(t-1) \leq (t-1)/2$, and the equality holds if and only if t=2g+1, wherein g is an odd prime number. Hence, according to embodiments of the present invention the first security parameter t is determined such that the Euler's totient function of the first security parameter minus one is larger than (t−1)/3, i.e. $\phi(t-1) > (t-1)/3$.

During step S1 or in a succeeding step, a second security parameter u can be generated. Thereby, the second security parameter u is greater than or equal to 0 and is smaller than the first security parameter t, i.e. u∈[0,t[, such that the greatest common divisor of the second security parameter u and the product of the first security parameter t and the input prime p is equal to 1, that is gcd(u, t·p)=1.

After the step S1 has been performed, the first security parameter t can be used together with the input values p, q, $d_p$, $d_q$, $q_{inv}$ and M to compute the control value σ in the second step S2. Thereby, the control value σ can be computed based on the following equation:

$$\sigma = [\sigma_q(1-\zeta_t) + \sigma_p\zeta_t] \mod t, \quad (7)$$

wherein $\sigma_q$ denotes a modular reduction of a value depending on the input message M and the input prime q with respect to a modulus being the first security parameter t. According to an embodiment of the present invention, $\sigma_q$ can be calculated according to $$\sigma_q = M^{d_q} \mod t. \quad (8)$$

In equation (7), $\sigma_p$ denotes a modular reduction of a value depending on the input message and the input prime p with respect to a modulus being the first security parameter t. According to an embodiment of the present invention, $\sigma_p$ can be calculated according to $$\sigma_p = M^{d_p} \mod t. \quad (9)$$

Having performed the computation of the control value σ in the second step S2, the modified input values $\hat{p}$, $\hat{q}$, $\tilde{q}$, $\tilde{q}_{inv}$ can be determined in step S3.

Here, a modified input parameter $\hat{p}$ is calculated from a product of the input parameter p and the first security parameter t, i.e. $\hat{p} = p \cdot t$. A further modified input parameter $\hat{q}$ is calculated from a product of the input parameter q and the first security parameter t, i.e. $\hat{q} = q \cdot t$. Yet a further modified input parameter $\tilde{q}$ is calculated from a product of the input parameter q and the second security parameter u, which has e.g. been determined in step S1, i.e. q̃=q·u. According to an embodiment of the present invention, in step S3 also a modified modular inverse q̃$_{inv}$ is determined based on a modular reduction of a product of the inverse $u^{-1}$ of the second security parameter u and the input parameter q with respect to the modulus being the input parameter p, i.e. q̃$_{inv}$=$u^{-1}$·q mod p.

The second security parameter u could, of course, also be computed in step S3 instead of step S1. Furthermore, the order of execution of step S2 and S3 could be reversed according to different embodiments of the present invention. However, it is advantageous to compute the control value σ as early as possible.

After the execution of step S3 leading to the modified input parameters p̂, q̂, q̃ and q̃$_{inv}$, an RSA computation with CRT is used in step S4 to generate a single modified output or output signature Ŝ based on $$\hat{S}=S_q+[(S_p-S_q)\cdot\tilde{q}_{inv} \bmod \hat{p}]\cdot\tilde{q} \quad (10)$$

wherein $S_q$ denotes a value obtained by a modular reduction of a value depending on the input message M with respect to a modulus determined by the modified input parameter q̂, and wherein $S_p$ denotes a value obtained by a modular reduction of a value depending on the input message M with respect to a modulus determined by the modified input parameter p̂. According to embodiments of the present invention, $S_p$, $S_q$ can be determined based on $$S_p=M^{d_p} \bmod \hat{p} \text{ and } S_q=M^{d_p} \bmod \hat{q}. \quad (11)$$

Note, that it is very important not to use q̂ instead of q̃ in equation (10). Since q̂=q·t it would destroy any information about an error in the big bracket.

After having determined the single modified output Ŝ in step S4, the single modified output Ŝ can be used to determine whether the first security parameter t is in a predefined relation to the control value σ in step S5. Or, in other words, it can also be determined whether the single modified output Ŝ is in a predefined relation to the control value σ using the first security parameter t. For that, a modular reduction of the single modified output Ŝ with respect to a modulus determined by the first security parameter t is computed. Then it is checked whether the result of the modular reduction is equal to the control value σ, i.e. it is checked whether Ŝ mod t=σ. If this is the case, then the output or the output signature S can be extracted from the single modified output Ŝ based on the relation $$S=\hat{S} \bmod (p\cdot q). \quad (12)$$

In case Ŝ mod t is not equal to σ, i.e. Ŝ mod t≠σ, an aforementioned countermeasure can be applied.

In step S5, an error detection based on a decisional test is performed. The decisional test, i.e. the comparison of (Ŝ mod t) to σ, can be protected, for example, by performing this decisional test more than once. This can be done by performing the decisional test of S5 sequentially or in parallel. By doing so, a bypass of the error detection by inducing a random fault in a status register of the decisional test can be avoided.

Note, that the whole critical RSA-CRT computation of step S4 is protected by a single fault-check in step S5. This means, that only the decisional test needs to be protected and no implementary security holes appear.

In order to protect the RSA-CRT computation even more efficiently, also against differential power analysis (DPA), more algorithmic modifications can be introduced, such that the cryptographic operations occur on data that is related to actual values by some mathematical relationship that survives the cryptographic operations. For this reason, more than the aforementioned two security parameters t, u can be used. Embodiments of the present invention may also use further, odd-valued randomization parameters $r_1$ to $r_4$.

Figure 2:
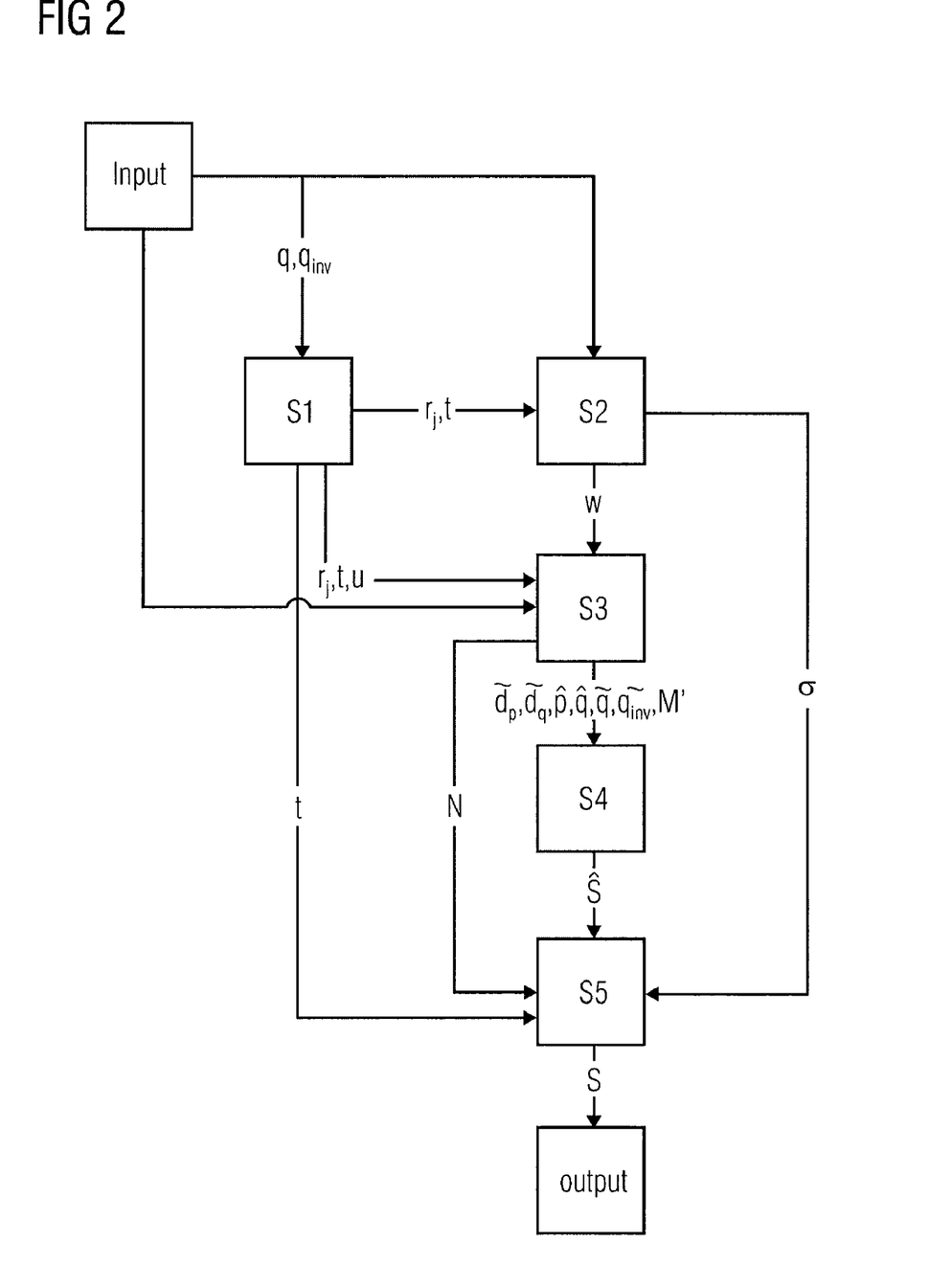
FIG. 2 shows a more detailed flow chart of a method for protecting an RSA calculation by means of the Chinese remainder theorem according to an embodiment of the present invention.

A detailed description of the method for protecting the RSA-CRT computation using the security parameters t, u and the randomization parameters $r_1$ to $r_4$ is described in detail in the following referring to FIG. 2.

According to embodiments of the present invention the security parameters t, u and the randomization parameters $r_1$ to $r_4$ are determined based on the input parameter q (and q$_{inv}$) in the first step S1.

According to embodiments the following criteria have to be fulfilled for the security parameters t, u and the randomization parameters $r_1$ to $r_4$.

The first security parameter t for the whole CRT computation is generated, such that t∈[$2^{16}$, $2^{64}$[\$F_4$ prime, such that φ(t−1) is big, with q$_{inv}$ mod t≠0 and ζ$_t$=q$_{inv}$·q mod t≠1. As mentioned before, the first security parameter t has to have certain properties, in particular the fact that q$_{inv}$ mod t≠0 and q$_{inv}$·q mod t≠1. The actual property is that ζ$_t$∉{0,1}, where ζ$_t$:=q$_{inv}$·q mod t. So, in S1 a candidate for the first security parameter t is chosen, then the property ζ$_t$∉{0,1} is checked. If it is not fulfilled, then a new first security parameter t will be used. Note that q and q$_{inv}$ are secret and nearly random parameters. An attacker cannot force them to have a certain value. Or, if he could, one can say that such an attack does not make any sense, since this is the value he wants to extract. So, the probability that the condition is not fulfilled is about 2/t, and it will practically never happen that two or more values for t will be thrown away.

Another important property for t is that φ(t−1) is as big as possible. This value is directly related to the error detection probability. Since (t−1) is an even integer, φ(t−1)≤(t−1)/2, and equality holds if and only if t=2·g+1, where g is an odd prime number.

The randomization parameters $r_1$ and $r_2$ for the input parameters p and q as well as $r_3$ and $r_4$ for the exponents $d_p$ and $d_q$ are generated, such that e.g. $r_1$∈[$2^{16}$, $2^β$[∩[0, (t−1)/2[, wherein $r_1$ is odd, $r_2$∈[$2^{16}$, $2^β$[∩[0, (t−1)/2[, wherein $r_2$ is odd, $r_3$∈[$2^{16}$, $2^γ$[Ω[0, (t−1)/2[, wherein $r_3$ is odd, and $r_4$∈[$2^{16}$, $2^γ$[Ω[0, (t−1)/2[, wherein $r_4$ is odd. According to embodiments of the present invention the numbers β, γ are chosen to be greater than 16. The fact that the randomization parameters $r_1$, $r_2$, $r_3$, $r_4$ are chosen to be odd, saves a factor 2 in the error detection probability. Furthermore, gcd($r_i$,t−1)=1 (i=1, 2, 3, 4).

Furthermore, the second security parameter u is generated in step S1, such that u∈[0, t[with gcd(u, $r_1$·t·p)=1, e.g. u=t−$r_1$. Since u should have the special property gcd(u, $r_1$·t·p)=1, the value u:=t−$r_1$ can be used for it. The property is fulfilled for this special value because of gcd(u,p)=1, since p is a prime larger than u, gcd(u,t)=gcd(t−$r_1$,t)=gcd($r_1$,t)=1, since t is a prime larger than $r_1$, and gcd(u,$r_1$)=gcd(t−$r_1$,$r_1$)=gcd(t,$r_1$)=1, since t is a prime larger than $r_1$.

According to an embodiment of the present invention, the inputs to the second step S2 are the input values p∈[0, $2^{2048+64}$[, q∈[0,$2^{2048+64}$[, M∈[0,N[(N=pq) and the values $d_p$∈[0,φ(p)[, $d_p$∈[0,φ(q)[, q$_{inv}$=$q^{-1}$ mod p, $r_1$,$r_2$,$r_3$,$r_4$, t, which can all be derived from the input values p, q.

In order to compute the control value σ in step S2, all input data of the RSA routine have to be reduced modulo t or (t−1) (in case of exponent parameters), i.e.

$$p_t := p \bmod t \quad (13)$$
$$p_{t-1} := p \bmod (t-1) \quad (14)$$
$$q_t := q \bmod t \quad (15)$$

-continued

| | | |
|---|---|---|
| $q_{t-1}$ | := q mod (t−1) | (16) |
| | $dp_{t-1}$ := dp mod (t−1) | (17) |
| $dq_{t-1}$ | := dq mod (t−1) | (18) |
| $q_{inv,t}$ | := $q_{inv}$ mod t | (19) |
| $\zeta_t$ | := $q_{inv,t} \cdot q_t$ mod t | (20) |
| $M_t$ := M mod t | | (21) |

Note that after the reduction, the parameters do contain only minimal (and not useful) information about the secrets, so these computations may not need the full care for security for the implementation.

Further, a correction of $M_t$ is done in step S2, since in the case of ($M_t$=0) or ($M_t$=1) or ($M_t$=t−1) the computation of the control value σ will not yield any or much information about an error in the main computation. Since M can be chosen by an attacker, it is better to make a correction on the message M than just choosing another first security parameter t. E.g. an attacker could choose the product of all first security parameters t which are stored on the chip. Hence, $M_t$ is modified with an iteration loop according to

```
ω := 0
while (M_t ∈ {0,1,t−1} ∨ ω = 0) do
    M_t := (M_t + (q_t · p_t)) mod t
    ω := ω + 1
end
```

During the modification of $M_t$, a new parameter ω is evaluated. This parameter ω will be important for the step S3 and has to be provided to it.

Modified exponent parameters for the modified input message $M_t$ can be computed based on $$\delta_p := dp_{t-1} + r_3 r_1 (p_{t-1} - 1) \bmod (t-1) \quad (22)$$

$$\delta_p := dp_{t-1} + r_4 r_2 (p_{t-1} - 1) \bmod (t-1) \quad (23)$$

Then, the control value σ can be computed based on the "small" CRT computation according to equation (7), wherein here $\sigma_q$ denotes a modular reduction of the modified input message $M_t$ raised to the power of $\delta_q$ with respect to a modulus being the first security parameter t according to $$\sigma_q = M_t^{\delta_q} \bmod t. \quad (24)$$

Further, $\sigma_p$ here denotes a modular reduction of the modified input message $M_t$ raised to the power of $\delta_p$ with respect to a modulus being the first security parameter t according to $$\sigma_p = M_t^{\delta_p} \bmod t. \quad (25)$$

Hence, as already described referring to FIG. 1, the control value σ for the whole RSA-CRT computation is determined in the second step S2. Compared to the embodiment described referring to FIG. 1, here the randomization parameters $r_1$ to $r_4$ are additionally involved in the determination of the control value ca.

Having performed the computation of the control values σ and ω in the second step S2, the modified input values $\hat{p}$, $\hat{q}$, $\tilde{q}$, $\tilde{q}_{inv}$ can be determined in step S3 based on the inputs p∈[0, $2^{2048+64}$[, q∈[0,$2^{2048+64}$[, $d_p$∈[0,φ(p)[, $d_q$∈[0,φ(q)[, $q_{inv}$=$q^{-1}$ mod p, M∈[0,N[, $r_1$, $r_2$, $r_3$, $r_4$, t, u, ω.

The modification of the input values for the RSA-CRT computation of step S4 starts first with the randomization of the most secret parameters p and q. Care has to be taken for the implementation of this sub-step of step S3.

$$p' := r_1 \cdot p, \quad (26)$$

$$q' := r_2 \cdot q, \quad (27)$$

The next sub-step of step S3 is the computation of the public key element N based on $$N := p \cdot q. \quad (28)$$

The parameter ω, gained in step S2, is involved in the modification of the message M according to $$M' := M + N \cdot \omega. \quad (29)$$

Then, the exponents have to be randomized. This is done in the following way:

$$\hat{p} = p' \cdot t, \quad (30)$$

$$\hat{q} = q' \cdot t, \quad (31)$$

$$\tilde{d}_p := d_p + r_3 (\hat{p} - t \cdot r_1), \quad (32)$$

$$\tilde{d}_q := d_q + r_3 (\hat{q} - t \cdot r_2). \quad (33)$$

Since q will not be used directly in the subsequent step S4, but randomized with u, the value $q_{inv}$ is also modified in step S3. The related sub-step involves an inversion, but since one of the numbers (namely u) is very small, the computation based on $$\tilde{q} := q \cdot u, \quad (34)$$

$$u_{inv} := u^{-1} \bmod \hat{p}, \quad (35)$$

$$\tilde{q}_{inv} := u_{inv} \cdot q_{inv} \bmod \hat{p}, \quad (36)$$

is not too time consuming.

After the execution of step S3 leading to the modified input parameters $\hat{p}$, $\hat{q}$, $\tilde{q}$ and $\tilde{q}_{inv}$, the RSA computation with CRT is used in step S4 to generate a single modified output or output signature $\hat{S}$∈[0,N·$2^{\beta+2r}$[based on the modified inputs ($\hat{p}$, $\hat{q}$, $\tilde{d}_p$, $\tilde{d}_q$, $\tilde{q}_{inv}$, $\tilde{q}$, M') based on equation (10), wherein $S_q$ denotes a value obtained by a modular reduction of a value depending on the input message M with respect to a modulus determined by the modified input parameter $\hat{q}$, and wherein $S_p$ denotes a value obtained by a modular reduction of a value depending on the input message M with respect to a modulus determined by the modified input parameter $\hat{p}$. According to embodiments of the present invention, $S_p$, $S_q$ can be determined based on $$S_p = M^{\tilde{d}_p} \bmod \hat{p} \text{ and } S_q = M^{\tilde{d}_p} \bmod \hat{q}. \quad (37)$$

The single modified output $\hat{S}$ generated in step S4 will provide, reduced modulo N, the result and, reduced modulo t, the control value σ—given that no fault attack has taken place.

Step S4 is almost a normal RSA-CRT computation with the only exception that the modulus $\tilde{q}$ used in the second exponentiation is not the parameter which is used in Garners formula as the prime factor on the right hand side. Note that the single modified output $\hat{S}$ will not be reduced in step S4, neither with respect to N nor to N·t. There is no need to do that, since the reductions take place in step S5.

In step S5, error detection based on a decisional test is performed has described above.

Regarding security provided by embodiments of the present invention, it has to be mentioned that DPA (differential power analysis) is possible at a point where unknown (but fixed) values come together with known (or even determinable) values. Known and secret values come together in step S4. Since in step S3 all the secret values are randomized, in step S4, all the secret values (even the intermediary ones) cannot be guessed by an attacker. So a (first order) DPA is not possible.

For DFA (differential fault analysis) a careful analysis and simulation was done with the result that all faults can be detected with a probability that depends on the first security parameter t:

The overall probability that a successful error induction is not detected is $\leqq$ $$\frac{2}{t}.$$

The worst case probability that a successful error induction is not detected is $$\leq \frac{4}{t}.$$

The only fault induction which cannot be detected is one by a faulty N or $\hat{S}$, i.e. only faults induced in step S5. But those are not fatal, since they do not include secret information any more. Note: If the computations in steps S1 to S4 have been done error free, then step S5 could be a public operation.

SPA (simple power analysis) cannot be covered by embodiments of the present invention. Important is the implementation of (in particular) the two exponentiations in step S4.

It is crucial that the input variables have to be checked after the computation, since, e.g., a change in the input value $d_p$ cannot be detected intrinsically. An alternative would be to compute and pass additionally the parameters $p_t, p_{t-1}, q_t, q_{t-1}, dp_{t-1}, dq_{t-1}, q_{inv,t}$ to the function. Of course, for this, the caller has to know the security value t.

Figure 3:
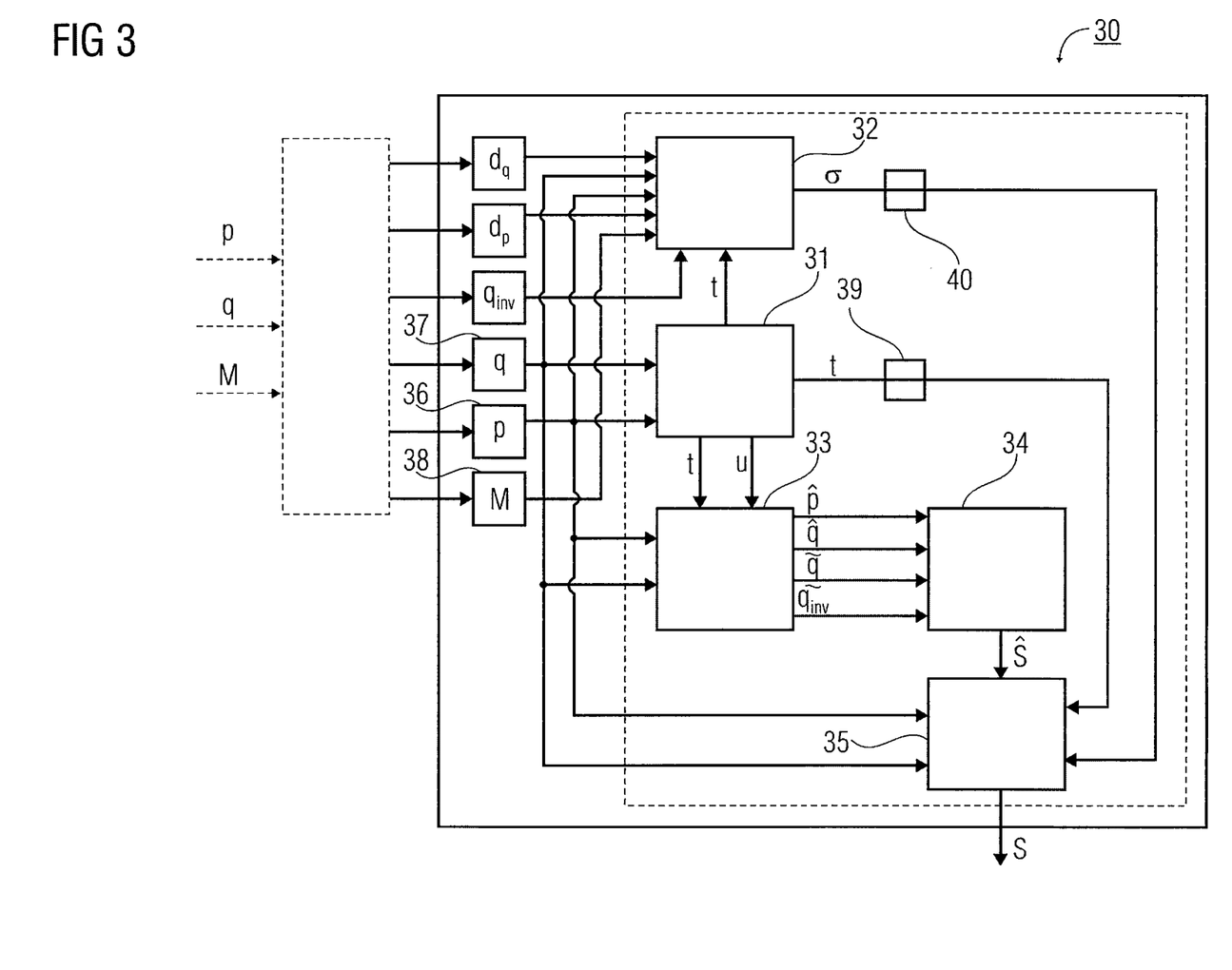
FIG. 3 shows a block diagram of an apparatus for performing a method according to FIG. 1 or 2.

In order to perform embodiments of the inventive method described before, an embodiment of the present invention provides an apparatus 30 for protecting an RSA-CRT calculation of an output S based on input values p, q, M. An embodiment of the apparatus 30 is shown in FIG. 3.

The apparatus 30 comprises a first determining device 31 for determining the first security parameter t based on the input values p, q. The apparatus 30 further comprises a computing device 32 for computing the control value σ based on the first security parameter t and the input values p, q and M. Means 33 for calculating modified input parameters $\hat{p}, \hat{q}, \tilde{q}$ and $\tilde{q}_{inv}$ based on the input values p, q and the first security parameter t is also provided. The apparatus 30 also comprises performing device 34 for performing the RSA-CRT calculation based on the modified input values $\hat{p}, \hat{q}, \tilde{q}$ and $\tilde{q}_{inv}$ to obtain the single modified output $\hat{S}$. The single modified output $\hat{S}$ is coupled to second determining device 35 for determining whether the first security parameter t is in a predefined relation to the control value σ and for applying a countermeasure in case the predetermined relation is not fulfilled.

According to embodiments of the present invention, the apparatus 30 comprises a first register 36 for the input prime p, a second register 37 for the input prime q, a third register 38 for the input message M, a fourth register 39 for the first security parameter t and a fifth register 40 for the control value σ.

The register content of the fourth register 39 is determined by the first determining device 31, which could be a processing sub-unit of a processing device, based on the first and the second input prime p, q. According to embodiments of the present invention the processing sub-unit 31 also produces the second security parameter u, for which a resister is provided as well.

The register content of the fifth register is computed by computing device 32, which also could be a processing sub-unit of a processing device, based on the input values p, q, M and the first security parameter t.

Performing device 34, which could be a processing sub-unit of a processing device, computes the single modified output message $\hat{S}$ based on modified register contents of the first and second registers 36, 37 and the contents of the registers related to the first and second security parameters t. Thereby the register contents of the first and second registers 36, 37 get modified in the processing sub-unit 33.

The second determining device 35, which could be a processing sub-unit of said processing device, has access to the single modified output message $\hat{S}$, the first, second, fourth and fifth registers 36, 37, 39, 40 and has an output for the output message S computed based on the single modified output message $\hat{S}$ and the register content of the first and second registers 36, 37 in case of a positive control operation. An error message is output in case of a negative control operation of the single modified output message $\hat{S}$. Thereby the control operation is based on the decisional test which has been described above referring to step S5.

It becomes evident from the embodiments described before that the calculations needed in steps S1 to S3 and step S5 are simple calculations, which are, anyhow, present in a crypto-computational unit, such as a multiplication algorithm or an algorithm for performing a modular reduction.

According to embodiments of the present invention the apparatus 30 is hence configured as a side-channel-attack-secure hardware block and is used in cryptographic applications. The apparatus 30 is thereby adapted for generating e.g. a signature for an asymmetric cryptographic scheme.

Hence, the present invention, due to its flexibility, safety and performance, is suitable in particular for cryptographic algorithms and for cryptographic coprocessors on which a safe and efficient implementation of the RSA-CRT algorithm suitable for signing as well as encryption is typically implemented by means of a circuit.

Depending on the circumstances, the inventive method may be implemented in hardware or in software. The implementation may be done on a digital storage medium, particularly a disk, CD or DVD with electronically readable control signals, which may cooperate with a programmable computer system so that the method is executed. In general, the invention thus also consists in a computer program product with a program code stored on a machine-readable carrier for performing the inventive method when the computer program product runs on a computer. In other words, the invention may thus be realized as a computer program with a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for protecting an RSA calculation of an output based on input values by means of the Chinese remainder theorem, the apparatus comprising:

a first determining device configured to determine a first security parameter based on the input values comprising two input primes and an input message;

a computing device configured to compute a control value based on the first security parameter and the input values;

a calculating device configured to calculate modified input parameters based on the input values and the first security parameter;

a performing device configured to perform the RSA calculation based on the modified input values to obtain a single modified output; and a second determining device configured to determine whether a modular reduction of the single modified output using a modulus derived from the first security parameter is in a predetermined relation to the control value and applying a countermeasure in case the predetermined relation is not fulfilled.

2. The apparatus according to claim 1, wherein the apparatus further comprises an extracting device adapted to extract the output based on the single modified output and the input values.

3. The apparatus according to claim 2, wherein the extracting device is further adapted to extract the output based on $$S = \hat{S} \bmod (p \cdot q),$$

wherein S is the output, $\hat{S}$ is the single modified output, q is the first input value and p is the second input value.

4. The apparatus according to claim 1, wherein the first determining device is further adapted to determine the first security parameter such that the modular multiplicative inverse of a first input prime modulo a second input prime modularly reduced by the first security parameter is not equal to zero and such that a modular reduction of a product of the first input prime and its modular multiplicative inverse modulo the second input prime with respect to a modulus being the first security parameter is not equal to one.

5. The apparatus according to claim 1, wherein the first determining device is further adapted to determine a second security parameter being greater than or equal to zero and being smaller than the first security parameter, such that the greatest common divisor of the second security parameter and a product of the first security parameter and a second input prime is equal to one.

6. The apparatus according to claim 1, wherein the first determining device is further adapted to determine four odd-valued randomization parameters lying in the interval $[2^{16}, 2^\gamma[\cap[0, (t-1)/2[$, respectively, wherein $\gamma$ denotes a number being greater than 16 and t denotes the first security parameter.

7. The apparatus according to claim 1, wherein the computing device is further adapted to compute the control value based on the following equation:

$$\sigma = [\sigma_q(1-\zeta_t) + \sigma_p \cdot \zeta_t] \bmod t$$

wherein $\sigma_q$ denotes a modular reduction of a value depending on the input message and a first input value and a modulus being the first security parameter, $\sigma_p$ denotes a modular reduction of a value depending on the input message and a second input value and a modulus being the first security parameter and wherein $\zeta_t$ denotes a modular reduction of a product of a value depending on the modular inverse of the first input value and a value depending on the first input value with respect to a modulus being the first security parameter.

8. The apparatus according to claim 1, wherein the computing device is further adapted to determine the control value based on $$\sigma = [(M^{d_q} \bmod t)(1-q_{inv} q \bmod t) + (M^{d_p} \bmod t) \cdot (q_{inv} q - \bmod t)] \bmod t$$

wherein $\sigma$ denotes the control value, M denotes an input message, $d_q$ denotes a value being greater than or equal to zero and being smaller than the Euler's totient function of a first input value, $d_p$ denotes a value being greater or equal to zero and being smaller than the Euler's totient function of a second input value, q and p denote the first and the second input values, respectively, $q_{inv}$ denotes the modular inverse of the first input value, and t denotes the first security parameter.

9. The apparatus according to claim 1, wherein the calculating device is further adapted to calculate a first modified first input value from a product of a first input value and the first security parameter, a modified second input value from a product of a second input value and the first security parameter, a second modified first input value from a product of the first input value and the second security parameter and to calculate a modified modular inverse of the first input value from a modular reduction of a product of the inverse of the second security parameter and the first input value with respect to a modulus being the second input prime.

10. The apparatus according to claim 8, wherein the performing device is further adapted to obtain the single modified output based on $$\hat{S} = S_q + [(S_p - S_q) \cdot \tilde{q}_{inv} \bmod \hat{p}] \cdot \tilde{q},$$

wherein $\hat{S}$ denotes the single modified output, $S_q$ denotes a value obtained by a modular reduction of a value depending on an input message with respect to a modulus determined by the first modified input value, $S_p$ denotes a value obtained by a modular reduction of a value depending on the input message with respect to a modulus determined by the second modified input value, $\tilde{q}_{inv}$ denotes the modified modular inverse of the first input value, $\tilde{q}$ denotes the second modified first input value and $\hat{p}$ denotes the modified second input value.

11. The apparatus according to claim 1, wherein the first determining device is further adapted to compute a modular reduction of the single modified output with respect to a modulus determined by the first security parameter and to check whether the result of this modular reduction is equal to the control value.

12. An apparatus for protecting an RSA calculation of an output based on input values, comprising a first and second input prime and an input message, by means of the Chinese remainder theorem, the apparatus comprising:

a first determining device adapted to determine a first security parameter such that the modular multiplicative inverse of the first input prime modulo a second input prime modularly reduced by the first security parameter is not equal to zero and such that a modular reduction of a product of the first input prime and its modular multiplicative inverse modulo the second input prime with respect to a modulus being the first security parameter is not equal to one;

a second determining device adapted to determine a first security parameter such that the second security parameter is greater than or equal to zero and smaller than the first security parameter, such that the greatest common divisor of the second security parameter and a product of the first security parameter and the second input prime is equal to one;

a computing device adapted to compute a control value based on $$\sigma = [\sigma_q(1-\zeta_t) + \sigma_p \cdot \zeta_t] \bmod t$$

wherein $\sigma_q$ denotes a modular reduction of a value depending on the input message and the first input prime with respect to a modulus being the first security parameter, $\sigma_p$ denotes a modular reduction of a value depending on the input message and the second input prime with respect to a modulus being the first security parameter and wherein $\zeta_t$ denotes a modular reduction of a product of a value depending on the modular inverse of the first input prime and a value depending on the first input prime with respect to a modulus being the first security parameter;

a modified input parameter calculating device adapted to calculate a first modified first input prime from a product of a first input prime and the first security parameter, a modified second input prime from a product of a second input prime and the first security parameter, a second modified first input prime from a product of the first input prime and the second security parameter and to calculate a modified modular inverse of the first input prime from a modular reduction of a product of the inverse of the second security parameter and the first input prime with respect to a modulus being the second input prime;

a performing device adapted to perform the RSA-CRT calculation based on the modified input values to obtain a single modified output based on $$\hat{S} = S_q + [(S_p - S_q) \cdot \tilde{q}_{inv} \mod \tilde{p}] \cdot \tilde{q},$$

wherein $\hat{S}$ denotes the single modified output, $S_q$ denotes a value obtained by a modular reduction of a value depending on the input message with respect to a modulus determined by the first modified input prime, $S_p$ denotes a value obtained by a modular reduction of a value depending on the input message with respect to a modulus determined by the second modified input prime; and a determining device adapted to determine whether the single modified output is in a predetermined relation to the control value and applying a countermeasure in case the predetermined relation is not fulfilled.

13. The apparatus according to claim 12, wherein the apparatus further comprises an extracting device adapted to extract the output based on $$S = \hat{S} \mod(p \cdot q),$$

wherein S is the output, $\hat{S}$ is the single modified output, q is the first input prime and p is the second input prime.

14. The apparatus according to claim 12, wherein the first determining device is further adapted to determine four odd-valued randomization parameters lying in the interval $[2^{16}, 2^\gamma[ \cap [0, (t-1)/2[$, wherein $\gamma$ denotes a number being greater than 16 and t denotes the first security parameter.

15. The apparatus according to claim 12, wherein the computing device is further adapted to determine the control value based on $$\sigma = [(M^{d_q} \mod t)(1 - q_{inv} q \mod t) + (M^{d_p} \mod t) \cdot (q_{inv} q \mod t)] \mod t$$

wherein $\sigma$ denotes the control value, M denotes an input message, $d_q$ denotes a value being greater than or equal to zero and being smaller than the Euler's totient function of a first input value, $d_p$ denotes a value being greater or equal to zero and being smaller than the Euler's totient function of a second input value, q and p denote the first and the second input values, respectively, $q_{inv}$ denotes the modular inverse of the first input value, and t denotes the first security parameter.

16. The apparatus according to claim 12, wherein the second determining device is further adapted to compute a modular reduction of the single modified output with respect to a modulus determined by the first security parameter and to check whether the result of this modular reduction is equal to the control value.

17. An apparatus for protecting an RSA calculation of an output message based on an input message and a first and a second input prime value by means of the Chinese remainder theorem, the apparatus comprising:
a first register for the first input prime value;
a second register for the second input prime value;
a third register for the input message;
a fourth register for a first security parameter;
a fifth register for a control value;
wherein a register content of the fourth register is determined based on register contents of the first and the second registers, wherein the fifth register content is determined based on the register contents of first, the second, the third and the fourth register, and wherein the apparatus comprising;
a processing sub-unit configured to compute a single modified output message based on modified register contents of the first and second register, and to determine whether a modular reduction of the single modified output message using a modulus derived from the first security parameter is in a predetermined relation to the register content of the fifth register and to apply a countermeasure in case the predetermined relation is not fulfilled.

18. A method for protecting an RSA calculation of an output based on input values by means of the Chinese remainder theorem, the method comprising:
configured a processor to perform the steps of:
determining a first security parameter based on a first input prime;
computing a control value based on the first security parameter and the input values comprising two input primes and an input message;
calculating modified input parameters based on the two input primes and the first security parameter;
performing the RSA calculation based on the modified input values to obtain a single modified output; and
determining whether a modular reduction of the single modified output using a modulus derived from the first security parameter is in a predetermined relation to the control value and applying a countermeasure in case the predetermined relation is not fulfilled.

19. The method according to claim 18, wherein the determining the first security parameter is performed such that the modular multiplicative inverse of a first input prime modulo a second input prime modularly reduced by the first security parameter is not equal to zero and such that a modular reduction of a product of the first input prime and its modular multiplicative inverse modulo a second input prime with respect to a modulus being the first security parameter is not equal to one.

20. The method according to claim 18, wherein the determining the first security parameter t comprises determining a second security parameter being greater than or equal to zero and being smaller than the first security parameter, such that the greatest common divisor of the second security parameter and a product of the first security parameter and a second input prime is equal to one.

21. The method according to claim 18, wherein the computing the control value is based on the following equation:

$$\sigma = [\sigma_q (1 - \zeta_t) + \sigma_p \cdot \zeta_t] \mod t$$

wherein $\sigma_q$ denotes a modular reduction of a value depending on the input message and a first input value and a modulus being the first security parameter, $\sigma_p$ denotes a modular reduction of a value depending on the input message and a second input value and a modulus being the first security parameter and wherein $\zeta_t$ denotes a modular reduction of a product of a value depending on the modular inverse of the first input value and a value depending on the first input value with respect to a modulus being the first security parameter.

22. The method according to claim 18 wherein the computing the control value is based on $$\sigma = [(M^{d_q} \bmod t)(1 - q_{inv} q \bmod t) + (M^{d_p} \bmod t) \cdot (q_{inv} q \bmod t)] \bmod t$$

wherein $\sigma$ denotes the control value, M denotes an input message, $d_q$ denotes a value being greater than or equal to zero and being smaller than the Euler's totient function of a first input value, $d_p$ denotes a value being greater or equal to zero and being smaller than the Euler's totient function of a second input value, q and p denote the first and the second input values, respectively, $q_{inv}$ denotes the modular inverse of the first input value, and t denotes the first security parameter.

23. The method according to claim 18, wherein the calculating the modified input parameters comprises calculating a first modified first input value from a product of a first input value and the first security parameter, a modified second input value from a product of a second input value and the first security parameter, a second modified first input value from a product of the first input value and the second security parameter and calculating a modified modular inverse of the first input value from a modular reduction of a product of the inverse of the second security parameter and the first input value with respect to a modulus being the second input prime.

24. The method according to claim 18, wherein the performing the RSA calculation is based on $$\hat{S} = S_q + [(S_p - S_q) \cdot \tilde{q}_{inv} \bmod \tilde{p}] \cdot \tilde{q},$$

wherein $\hat{S}$ denotes the single modified output, $S_q$ denotes a value obtained by a modular reduction of a value depending on an input message with respect to a modulus determined by the first modified input value, $S_p$ denotes a value obtained by a modular reduction of a value depending on the input message with respect to a modulus determined by the second modified input value.

25. A computer-program for performing the method according to claim 18, when the computer-program is executed on a computer and/or microcontroller.

* * * * *